UNITED STATES PATENT OFFICE.

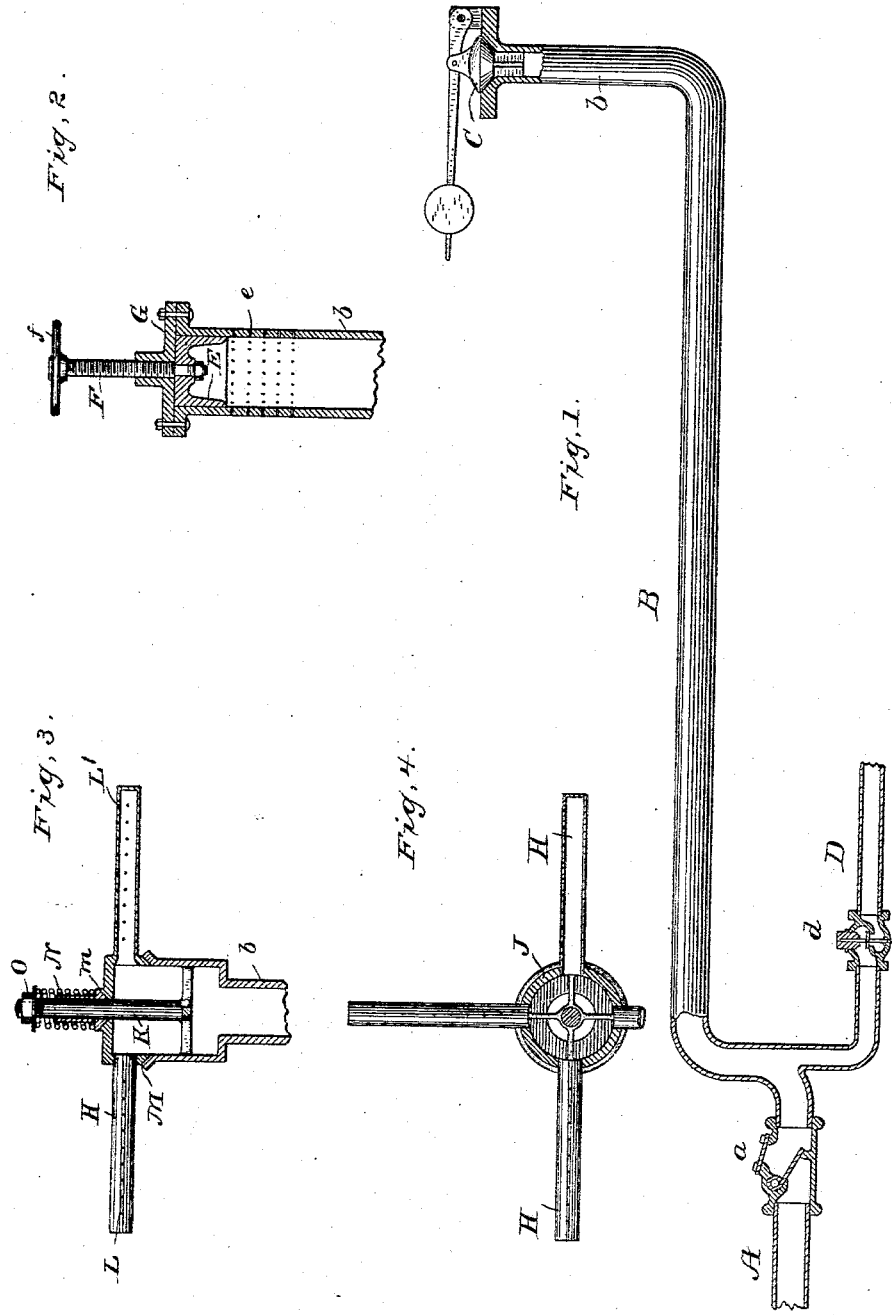

ALBERT R. LEEDS, OF HOBOKEN, NEW JERSEY.

APPARATUS FOR PURIFICATION OF WATER.

SPECIFICATION forming part of Letters Patent No. 323,432, dated August 4, 1885.

Application filed December 26, 1884. (No model.)

*To all whom it may concern:*

Be it known that I, ALBERT R. LEEDS, a citizen of the United States, residing at Hoboken, in the county of Hudson and State of New Jersey, have invented certain new and useful Improvements in Apparatus for Purification of Water, of which the following is a specification, reference being had to the accompanying drawings.

The present invention relates to improvements in apparatus for the purification of water, which purification is effected by the forcible admixture with a moving column of water of a large quantity of air, which, being brought intimately into contact therewith under a great artificial pressure, parts with a very large proportion of its oxygen, which, under the aforesaid conditions, is absorbed by the water and serves to purify the same by oxidizing and destroying the organic and vegetable impurities contained therein. I apply my system to some convenient portion of the receiving or distributing water-mains of a city, and find by experience that the solution and absorption of the desired amount of oxygen by the water are best effected at a pressure of from one hundred to one hundred and fifty pounds to the square inch, and I provide means for regulating the pressure of a sufficient portion of a system of pipes within which to effect the combination desired without affecting or altering the pressure found suitable in an established system. In carrying out my invention I use a section of pipe of the desired length, and instead of depending upon its vertical position, or being restricted to a vertical pipe or other similar means for producing hydrostatic pressure, I use a straight or curved pipe, which may be horizontal or at any other desired angle, and of a length sufficient to effect the desired mixing, and at the outer end of this pipe I place a loaded valve, nozzle, sprinkler, or other form of contracted opening for the purpose of creating a controllable artificial pressure within the aforesaid section of pipe.

In the accompanying drawings, Figure 1 is an elevation, partly in section, of a pipe having inlet-valves and connections at one end and a loaded discharge-opening at its other end. Fig. 2 is a sectional elevation of another form of discharge. Fig. 3 is a sectional elevation of a discharging device consisting of a rotating sprinkler, and Fig. 4 is a detail plan view of the rotating sprinkler.

Similar letters denote like parts.

A is an inlet-pipe supplying water under pressure, and $a$ is a check-valve therefor. B is a section of line-pipe, which may be of any desired size, thickness, or length, from a few yards to as many miles; and although for the purpose of illustration I have shown it straight and in a horizontal position, in practice the said pipe will follow the undulations of the surface, as is usual with water-conveying pipes. The said pipe B terminates in an upwardly-extending portion, $b$, provided with a loaded valve, C. D is an inlet-pipe, also communicating with the main B, and provided with check-valve $d$. With this construction it will be evident that if water under pressure is supplied through the pipe A and air under pressure through the pipe D, the two will be forced to combine, or at least travel together through the pipe B, and the pressure which will be constantly maintained throughout the pipe B will be determined by the weight upon the valve C.

The end $b$ of the conveying-pipe is intended to discharge into a suitable reservoir, and I find it desirable in some instances to use, instead of a plain loaded valve around the edges of which the water escapes in a thin sheet or in the form of a spray, some devices for more finely dividing the water as delivered and facilitating the purification thereof by bringing it into contact with the sun and air. This will also allow the escape of any vitiated gases that may have accumulated by reason of the action of the oxygen upon the water during its passage through the conveying-pipe B.

In Fig. 2 I have shown the pipe B as provided with rows of perforations $e$, the pipe itself being provided with a neatly-fitted piston, E, which, by means of a screw-threaded rod, F, may be moved vertically within the pipe, so as to cover, and thereby close, more or fewer of the perforations. The rod F is suitably mounted in the screw-threaded cap G, which closes the pipe $b$, and is also provided with suitable hand-wheel, $f$, and by raising or lowering the piston E, and thereby increasing or diminishing the outlet for the water, the pressure within the pipe B and conveying-pipe B can be regulated as desired.

In Figs. 3 and 4 I show another form of discharge, which consists of a sprinkler having a number of hollow arms, H, radiating from the hub J, which is mounted upon a suitable support, K, secured within the pipe b, the upper edge of which is fitted with a suitable bearing, M, to receive the lower portion of the hub J, which, being supported thereon and held in position by the support K, is free to be rotated by the force of the water issuing from lateral apertures L in the arms H, which are also provided with vertical apertures L'. In order to increase the capacity of the discharge, and to prevent its being raised from its seat M, I provide a bearing, m, in the upper side of the hub J and surrounding the supporting-rod K, above which I place a spiral spring, N, secured in position by a suitable washer and nut, O, by which the tension of said spring can be adjusted, and by thus effecting the rotations of the arms H the pressure in the pipe will be increased or diminished, as desired.

In case any sudden and unexpected pressure should be thrown into the pipe B with either the valve C or the sprinkler, no damage could result, as they would be entirely raised from their seats and an ample outlet be provided.

Having described my invention, what I claim, and desire to secure by Letters Patent, is—

The combination, with a main conveying-pipe, of pipes supplying water and air, both under pressure, thereinto, and of an adjustable valve continuously controlling the discharge from and the pressure within said conveying-pipe, and adapted to deliver the water in a more or less finely-divided condition, substantially as set forth.

In testimony whereof I hereunto affix my signature in presence of two witnesses.

ALBERT R. LEEDS.

Witnesses:
F. LUTHIN,
RUD. BECHERT.